INVENTOR.
Ralph C. Kennedy
BY [signature]
ATTORNEY

Aug. 5, 1958 R. C. KENNEDY 2,846,497

TELEVISION SYSTEMS

Filed March 5, 1953 5 Sheets-Sheet 2

INVENTOR.
Ralph C. Kennedy

BY Chas. F. Mitchell

ATTORNEY

INVENTOR.
Ralph C. Kennedy
BY [signature]
ATTORNEY

INVENTOR.
Ralph C. Kennedy
BY [signature]
ATTORNEY

Aug. 5, 1958 R. C. KENNEDY 2,846,497

TELEVISION SYSTEMS

Filed March 5, 1953 5 Sheets-Sheet 5

INVENTOR.
Ralph C. Kennedy

BY [signature]

ATTORNEY 2,846,497

TELEVISION SYSTEMS

Ralph C. Kennedy, Queens Village, N. Y., assignor to Radio Corporation of America, a corporation of Delaware Application March 5, 1953, Serial No. 340,468

6 Claims. (Cl. 178—5.1)

The present invention relates to improvements in television transmission systems, particularly of the secrecy type in which it is desired to encode or otherwise garble the television transmission signal such that it can be successfully reproduced only by specialized television receiving equipment.

The present invention further relates to improved means for remotely controlling the mode of picture presentation at a television receiving location in such a way as to permit useful reconstruction of otherwise garbled television signals.

In more particularity, although not necessarily exclusively, the present invention relates to an improved subscriber type television system in which improved means are provided for transmitting a coded television image signal representing a distorted and useless television scene, but which can be processed and caused to display a high quality television image only by television receivers having decoding, reconstituting or descrambling equipment coordinated with the mode of coding or scrambling employed at the transmitter.

The present invention also relates to improved means for controlling or scheduling the garbling of television type signals for transmission over subscriber television signal channels and provides improved techniques in simplifying the reconstitution of the garbled signal into a useful television scene of high picture quality.

A successful subscriber type television system should be capable of transmitting a television signal virtually meeting the Federal Communications Commission's standards for television signal transmission yet upon being received by a standard home television receiver should present an image which has little or no entertainment value. However, the system should be such as to allow modification of, or minor addition to, the standard home receiver at a minimum expense to the owner such that the owner may, upon paid subscription to a decoding or descrambling agency, be permitted to view the then unscrambled and recovered television broadcasts with all the clarity and entertainment enjoyment normally obtained from standard television broadcasts.

Numerous schemes have been suggested in the prior art for providing such an arrangement. In the main part, the most generally desirable type of system is one in which no reliance is made upon auxiliary communication channels but confines its requirements for communication of coding and decoding information between transmitter and receiver, to the standard television and sound channels now provided in accordance with Federal Communications Commission standards. Moreover, regardless of the method of transmitting decoding information from the transmitter to the receiver most prior art systems have been unable to provide obliteration of image information to the point of uselessness when received by standard television receivers without suffering a residual degradation in picture quality upon attempted reconstruction or decoding of the signal, and have been forced to accept a lower transmission efficiency.

Thus, the criteria for evaluating a system for scrambling or garbling television pictures for subscriber consumption appear to be: (1), ease of transmitting necessary decoding control information; (2), the completeness with which entertainment value of the picture is destroyed by the encoding or scrambling means employed; (3), the degree of picture degradation suffered upon attempted reconstruction or decoding of the picture; (4), the simplicity of the equipment necessary to alter and/or supplement standard television receiving circuits to accomplish decoded reception of subscriber types of broadcasts; and (5), "secrecy" or the degree of security the system has against successful use by non-subscribers.

A highly effective picture scrambling system according well with the above criteria has been disclosed in a copending United States patent application, Serial No. 308,642, filed September 9, 1952, entitled "Television Systems," by Alfred N. Goldsmith et al., in which television picture scrambling is provided by controlled and coordinated motion of the television raster in a plurality of directions as viewed on a non-subscriber or unmodified television receiver. This is accomplished by a form of overall Lissajous motion of the transmitted television image. Lissajous motion may be defined as that of a point displaced in two or more directions with any desired frequencies of displacement in each such direction, with any desired phase relationship between the displacements in each direction and with any selected ratio of amplitudes of the said displacements. Lissajous figures are, illustratively, straight lines in any direction, circles, ellipses with major axes in any direction, figures of eight with axes in many directions and numerous and complex reentrant or non-reentrant multicyclic curves.

To accomplish the required Lissajous garbling of the subscriber television system the Goldsmith et al. arrangement employs the agency of separate horizontal and vertical shift signals transmitted from a transmitting location to a receiving location. Thus, vertical and horizontal raster shift components employed to garble the transmitted scene can be detected at the receiving location and employed in a complementary manner to reconstruct the television scene. However, it is necessary in the practice of the Goldsmith et al. invention to continuously transmit, by some agency, horizontal and vertical raster shifting signals. The continuous transmission of such signals immediately opens up the possibility of unauthorized reception of the shift signals and the employment of information gleaned from such reception in the unlicensed reconstruction of the television signal.

In order, then, to realize a high degree of security in the Goldsmith et al. system, or other types of signal scrambling arrangements, it is desirable to employ some form of decoding apparatus which must be specially controlled in a predetermined fashion in order for successful decoding of the television signal to be accomplished. One form of special control agency, useful for such work, would be a card having fixed thereto a predetermined pattern of conductive paths which control the switching of the decoding apparatus in the predetermined fashion. One general form of such a switching arrangement is described in United States Patent No. 2,734,954 issued on February 14, 1956, to Marshall C. Kidd.

The present invention provides a greatly simplified mode of control signal transmission which is useful in reconstructing a scene represented by the television signal, only if predetermined circuit switching means are employed at the receiving location. In one embodiment of the present invention, a binary counting chain is employed at both transmitting and receiving locations. The binary counter chain is driven by a random signal which is related to the scanning rate of the television scene. Each time the transmitting counter is stepped a drive tone is transmitted over the sound channel of the television station. The transmitter counter is randomly reset in accordance with a reset signal also transmitted over the sound channel of the television station. The drive and reset signals received at the television receiver are employed to drive and reset the receiver binary counter. Both transmitter and receiver are provided with television raster shifting means for shifting the television raster horizontally and vertically upon the reaching of various predetermined counts in the transmitter and receiver binary counters. The particular count to which the television raster is shifted and the particular manner in which the raster is shifted upon reaching a predetermined count is placed under the control of a circuit switching means such as the above-mentioned control card.

In the practice of the present invention it is also contemplated to provide simplified means for imposing raster shifting signals upon the deflection action of the television receiver either by a special image reconstruction yoke surrounding the kinescope as described in copending United States patent application, Serial No. 308,625, by Marshall C. Kidd, entitled "Image Reconstruction Systems," filed October 9, 1952, or through the series insertion of control signals in the centering and deflection yoke circuit of a receiver. The present invention, therefore, involves the provision of novel and improved means for controlling the deflection of a cathode ray beam.

It is, therefore, an object of the present invention to provide an improved subscriber system for television broadcasts.

It is further an object of the present invention to provide improved means and methods for scrambling television broadcasts in such a way as to render their normal reception of little entertainment value but provide specially equipped television receivers with high quality television images.

It is further an object of the present invention to provide an improved method of scrambling and descrambling television broadcasts which requires no communication channels other than a video and associated sound channel now standard in the television art.

It is another object of the present invention to provide a subscriber type television system in which standard television receivers may be easily and economically adapted for successful reception of scrambled subscriber television transmissions.

It is a further object of the present invention to provide an improved television secrecy system of the subscriber variety which employs the transmission of decoding control signals in themselves conveying insufficient information to permit reconstruction of the television signal.

It is another object of the present invention to provide an improved subscriber system for television broadcast which requires the utilization by a subscriber of a card control element in order to successfully reconstruct the garbled television scene.

A more complete understanding of the present invention, its mode of operation and other features of advantage will be gleaned from a reading of the following description especially when taken in consideration with the accompanying drawings.

Figure 5:
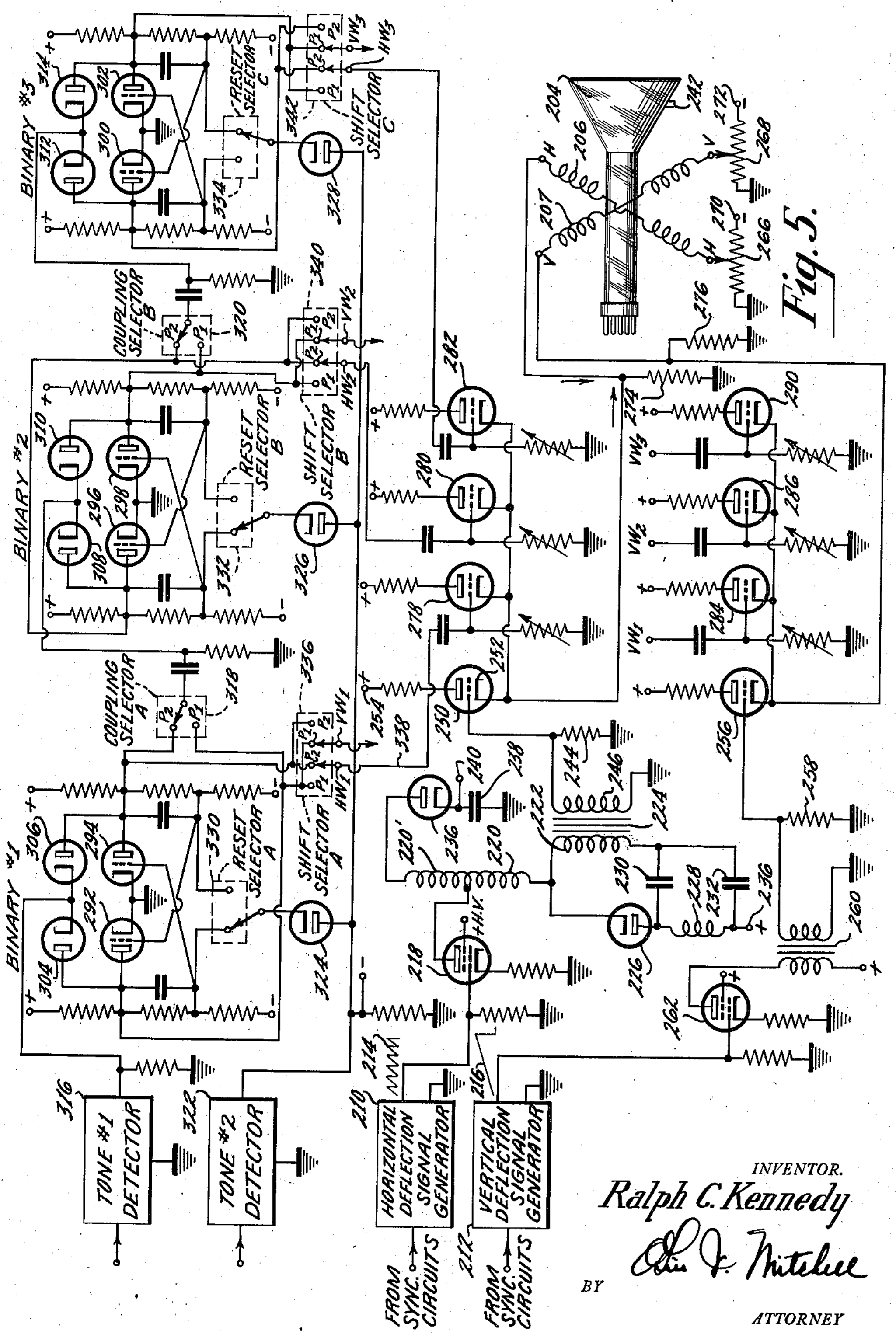

Figure 5 is a combination block and schematic representation of a binary counter chain and control arrangement in accordance with the present invention. Means are also illustrated for controlling the operation of the binary counter chain in accordance with circuit information carried by a control card. Also illustrated are means for transducing binary counter chain operation into vertical and horizontal raster shift signals as employed in the practice of the present invention.

Figure 6:
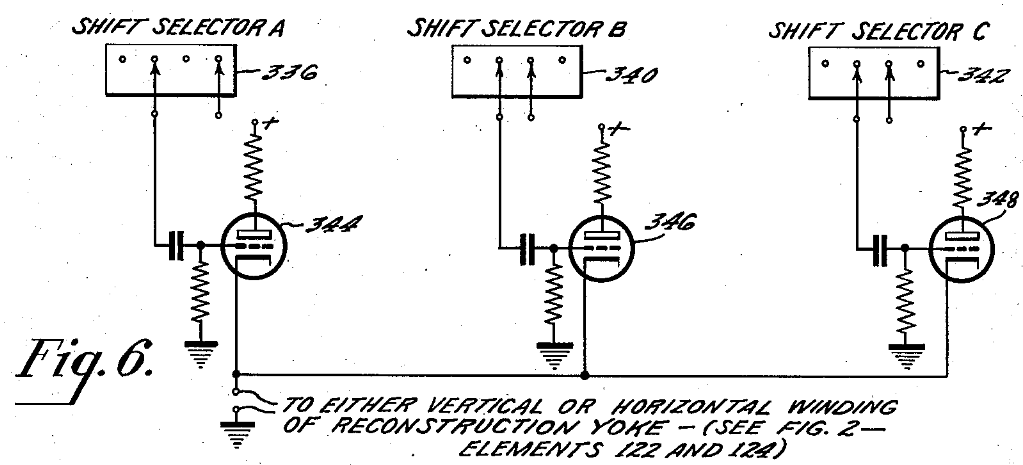

Figure 6 is a schematic representation of still another way of imposing vertical and horizontal raster shift signals into the deflection circuit of a television receiver.

Figure 7:
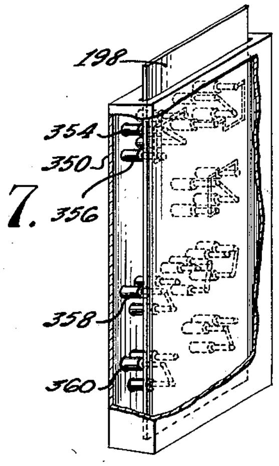

Figure 7 is an elevational view of one form of control card holder which may be used in the practice of the present invention.

Figure 8:
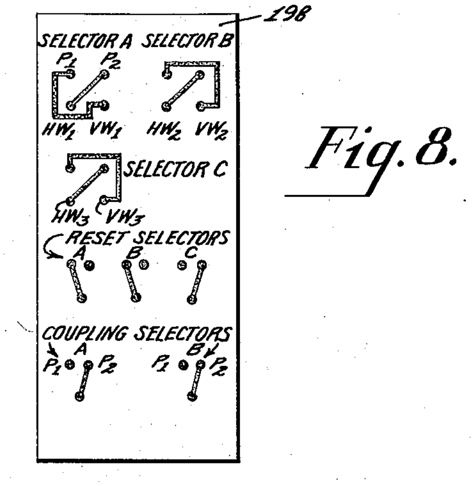

Figure 8 is a plan view of a control card illustrating one possible control circuit configuration as it may be employed in the practice of the present invention.

Figure 1:
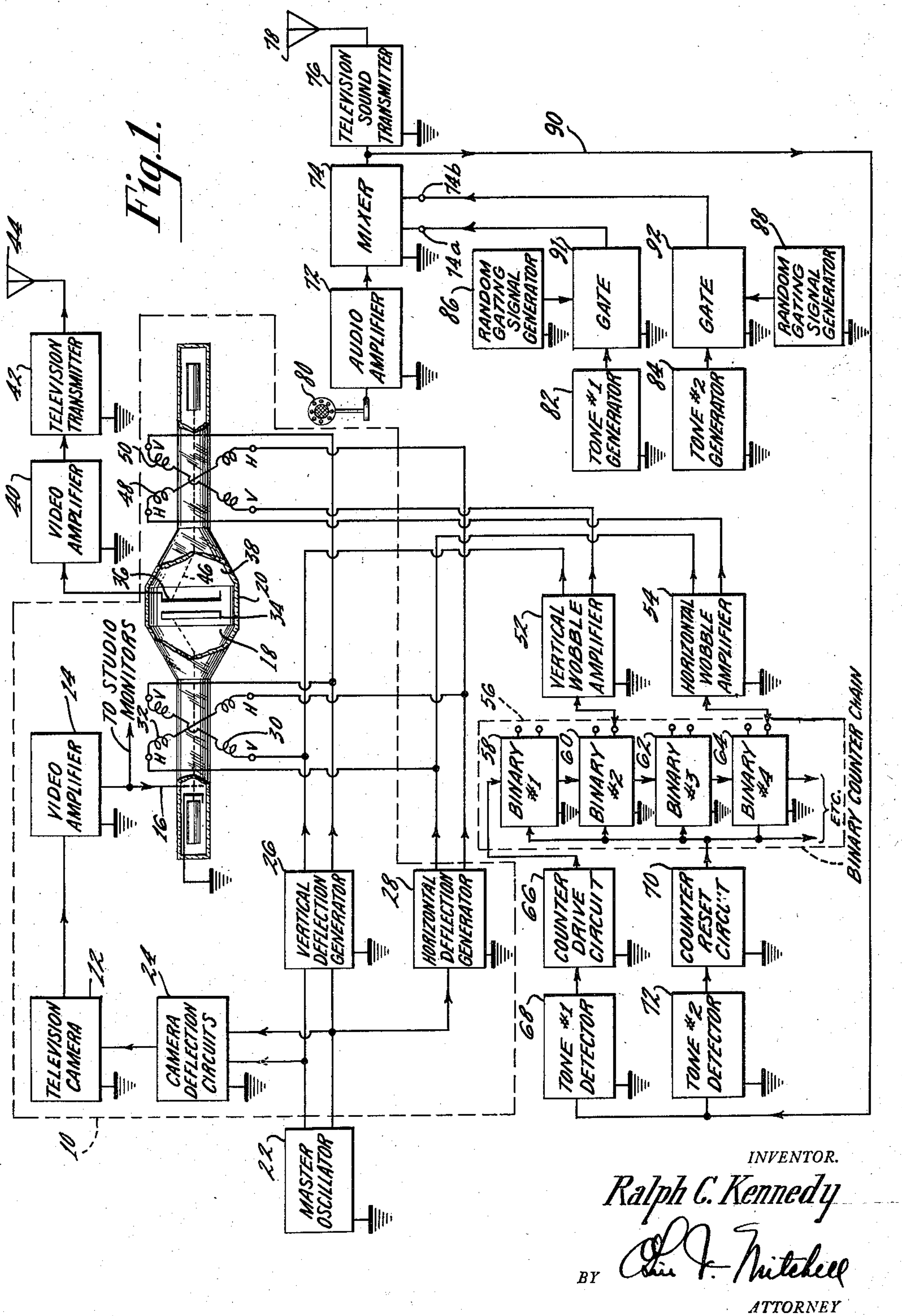
Figure 1 is a block diagram representation of one form of television picture scrambling and transmitting arrangement useful in the practice of the present invention.

Turning now to Figure 1, there is illustrated in the dotted line area 10 a television camera system employing a television pickup and video signal processing arrangement, including a rectangular scanning means comprising a vertical and horizontal deflection system. Within the dotted line area 10 is shown a conventional television camera 12 adapted to feed a conventional video amplifier 14 whose output signal is in turn applied to the input circuit 16 of the writing section 18 of a conventional electron ray storage tube 20. Deflection for the television camera 12 is timed by the master oscillator 22 whose horizontal and vertical timing signals are applied to conventional camera deflection circuit 24. Vertical and horizontal timing signals are also applied to the vertical and horizontal deflection generators 26 and 28 employed for the deflection of storage tube 20 as shown. The output signals from the vertical deflection generator 26 are applied to the vertical deflection coils 30 of the writing section of the storage tube 20. The output signals from the horizontal deflection generator 28 are correspondingly applied to the horizontal deflection coil 32 of the writing section of the storage tube 20. By this means the image picked up by the television camera 12 will be written with substantial fidelity on the target 34 of the storage tube 20.

The output electrode 36 of the reading section 38 of the storage tube 20 is connected with the input circuit of video amplifier 40 whose output signals are in turn adapted for modulation of a television video transmitter 42. The output signal of a transmitter 42 is applied to some form of television antenna 44. Deflection for the reading beam 46 of the storage tube 20 is supplied by the horizontal and vertical deflection coils at 48 and 50. If the deflection signals through the deflection coils 48 and 50 are identical in waveform to signals supplied to the writing deflection coils 30 and 32, it is manifest that the video signal applied to the video amplifier 40 will be substantially identical to the video signal appearing at the output of television camera 12.

In accordance with the television garbling system described in the above-identified United States patent application, Serial No. 308,642, "Television Systems" by A. N. Goldsmith et al., filed September 19, 1952, the deflection voltage applied to the reading deflection coils 48 and 50 of the storage tube 20 is a composite signal made up of the combination of the deflection waveform appearing at the output terminal of the vertical and horizontal deflection generators 26 and 28 and the corresponding wobble waveforms appearing at the output terminals of the vertical and horizontal wobble amplifiers at 52 and 54. For this purpose it can be seen that the horizontal reading deflection coil 48 is connected with the output circuit of the horizontal deflection generator 28 through a series connection with the output circuit of the horizontal wobble amplifier 54. Likewise, the vertical reading deflection coil 50 is supplied with the output signal of the vertical deflection generator 26 to the series connection of the output circuit of the vertical wobble amplifier 52. Thus, the transmitted television signal will be garbled to the extent of having the effective transmitting scanning raster shifted vertically and horizontally by signals delivered by the vertical and horizontal wobble amplifiers.

In accordance with the present invention the driving signals for the vertical and horizontal wobble amplifiers may be considered as raster shift signals. That is, the signals applied to the vertical and horizontal wobble amplifiers will be of a square or stepped waveform, such that the scanning raster of the transmitted television signal will be effectively shifted either vertically or horizontally during television blanking intervals, but remain stationary during the actual scanning of the television raster. This is accomplished, in accordance with the present invention, by means of a binary counter chain shown in the dotted line area 56 comprising binary stages 58, 60, 62 and 64, respectively designated as "Binary 1," "Binary 2," "Binary 3," and "Binary 4" in the drawings in Figure 1. Additional binary stages may be employed but four are shown for illustrating the principle underlying the present invention. The binary counter chain 56 is driven by a conventional pulse producing circuit 66, designated as a counter drive circuit. The counter drive circuit 66 is in turn controlled by output signal from a tone detector circuit 68 designated as "Tone No. 1 detector." The binary counter chain 56 may in turn be reset by signals appearing at the output terminal of the counter reset circuit 70, in turn driven by a tone detector 72 designated as "Tone No. 2 detector." The significance of the tone detectors 68 and 72 will be described shortly. It is sufficient here to note that the vertical and horizontal wobble amplifiers will be supplied with raster shift signals by merit of the binary counter chain 56 having reached predetermined counting conditions. Accordingly, as shown, the vertical wobble amplifier 52 will receive a raster shift signal at a chain count, for example, of four, while the horizontal wobble amplifier 54 will receive a horizontal shift signal at a chain count, for example, of 16.

The novel means by which the counter drive and counter reset circuits 66 and 70 are controlled forms another aspect of the present invention and is shown in connection with the sound channel of the television transmitting system of Figure 1. An audio amplifier 72 is illustrated as feeding into a mixer channel 74 output signals from which modulate a television sound transmitter 76. The sound channel from the transmitter may be broadcast by means of antenna 78. A microphone 80 is illustrated as one type of conventional sound source that might be employed. The mixer circuit 74 is adapted to receive randomly occurring bursts of two supersonic tones respectively generated by tone No. 1 generator at 82 and tone No. 2 generator at 84. Random gating signals developed by the circuits at 86 and 88, in turn control the opening and closing of gate circuits 90 and 92 so that the bursts of controlled tone reaching the mixer 74 are under the control of the gating signals produced by the gating signal generators 86 and 88. In accordance with the present invention, tone No. 1 may be arbitrarily assigned as a counter drive tone and tone No. 2 may be arbitrarily assigned as a counter reset tone. By means of circuit path 90 tone No. 1 and tone No. 2, in addition to being transmitted by the transmitter 76, are applied to the tone detectors 68 and 72 described above.

It can, therefore, be seen that in accordance with the present invention, the binary counter chain 56 will be randomly driven and reset in accordance with the random nature of the gating signals produced by the gating signal generators 86 and 88. The shifting of the transmitted television raster will, therefore, also be random in nature and provide a high degree of security against the useful reconstruction of the television picture by unauthorized personnel not having a receiver counter chain connected in the precise fashion of the transmitter counter chain array and sensitive to the particular tones broadcast by the transmitter to accomplish proper control of such a counter chain.

Figure 2:
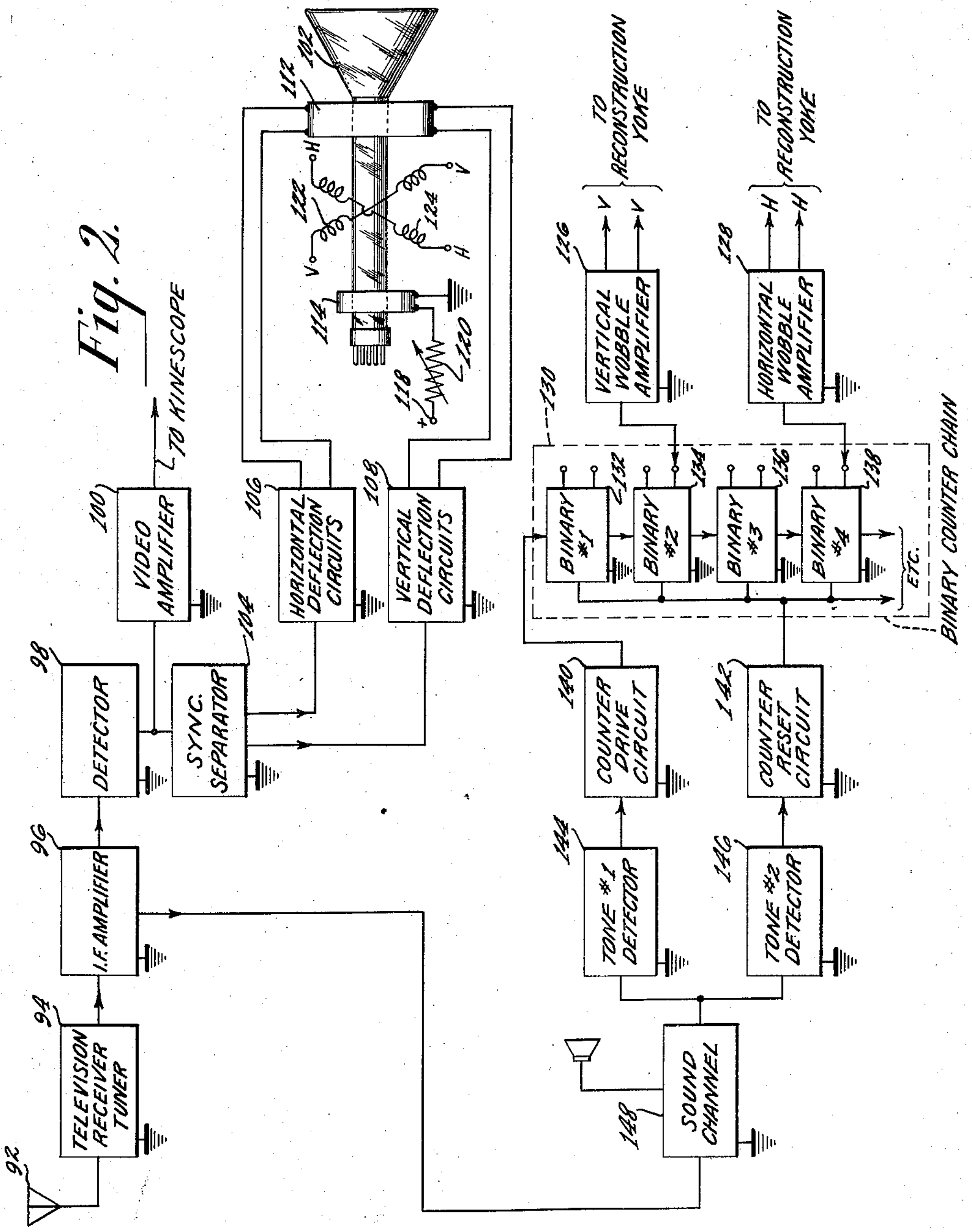
Figure 2 is a block diagram representation of one form of television receiving and image reconstruction arrangement for successfully reproducing the scrambled television broadcasts produced by the arrangement of Figure 1.

One form of receiving arrangement for reception and reconstruction of the signal transmitted by the transmitter of Figure 1 is shown in Figure 2. Here the received garbled television signal is intercepted by the antenna 92 and applied to a television receiver tuner circuit 94, output signal from the tuner 94 is conventionally applied to I.-F. amplifier strip 96 which in turn supplies signal to the detector circuit 98. The detected television signal is applied to a video amplifier 100 which in turn drives the beam modulating input circuit of the kinescope 102. For purposes of illustrational convenience, no beam conducting circuit connections, per se, have been shown. Demodulated video signal is also applied to a conventional form of sync separator circuit 104 having respective output lines connected with, and for the control of, horizontal and vertical deflection circuits 106 and 108. Output signals from the output vertical and horizontal deflection circuits 106 and 108 are further conventionally applied to a cathode ray beam deflection yoke represented by element 112. Focus coil 114 is also shown connected with a source of focus control current having a terminal at 118, varying the rheostat 120 controls the yoke through 114 and thereby affords focus control in the kinescope 102 in a well known manner. An image reconstruction deflection yoke comprising vertical windings 122 and horizontal windings 124 is provided in accordance with the invention described in the United States patent application, by Marshall C. Kidd, entitled "Image Reconstruction System," filed September 9, 1952, Serial No. 308,625, for producing a complementary raster shifting influence on the kinescope electron beam so as to allow degarbling of the incoming television signal. The vertical shift winding 122 is indicated for connection to the output circuit of the vertical wobble amplifier 126, while the horizontal reconstruction yoke winding 124 is designated for connection with the horizontal wobble amplifier 128.

It will be observed in Figure 2 that in accordance with the present invention, the vertical and horizontal wobble amplifiers 126 and 128 are connected for driving by a binary counter chain 130 which is equivalent to the transmitter binary counter chain 56 in Figure 1. Binary stages 132, 134, 136 and 138 find their counterpart in the transmitter arrangement in the binary counter stages 58, 60, 62 and 64. The receiver binary counter chain 130 is also provided with counter driving and reset circuits 140 and 142 respectively. The counter drive and reset circuits are in turn controlled by the tone detector circuits 144 and 146 in a manner previously described in connection with the tone detector circuit 68 and 72 in Figure 1. The sound channel 148 of the receiver may be conventional in nature, with the exception that it must be capable of reproducing supersonic signal frequencies employed for tone No. 1 and tone No. 2. The sound channel conventionally receives its driving signal from the I.-F. amplifier 96. It is clear, however, that sound channel 148 may also be of the well known intercarrier type which may receive its driving signal from a point in the receiver circuit following the I.-F. amplifier 96.

By simultaneous reference to the transmitter arrangement of Figure 1 and the receiver arrangement of Figure 2 it can be seen that in accordance with the present invention the transmitter and receiver binary counter chains will operate in synchronism with one another. Thus, every time the transmitter vertical or horizontal wobble amplifier receives a shift signal from the binary counter chain 56 the vertical and horizontal amplifiers 126 and 128 of the receiver will receive a corresponding signal of identical waveform from the receiver binary counter chain 130. If then the phase or electrical sense of the deflection influence provided by the reconstruction yoke windings 122 and 124 is made complementary to that produced in the transmitter, precision reconstruction of the garbled television signal is made possible at the receivers.

Figure 4:
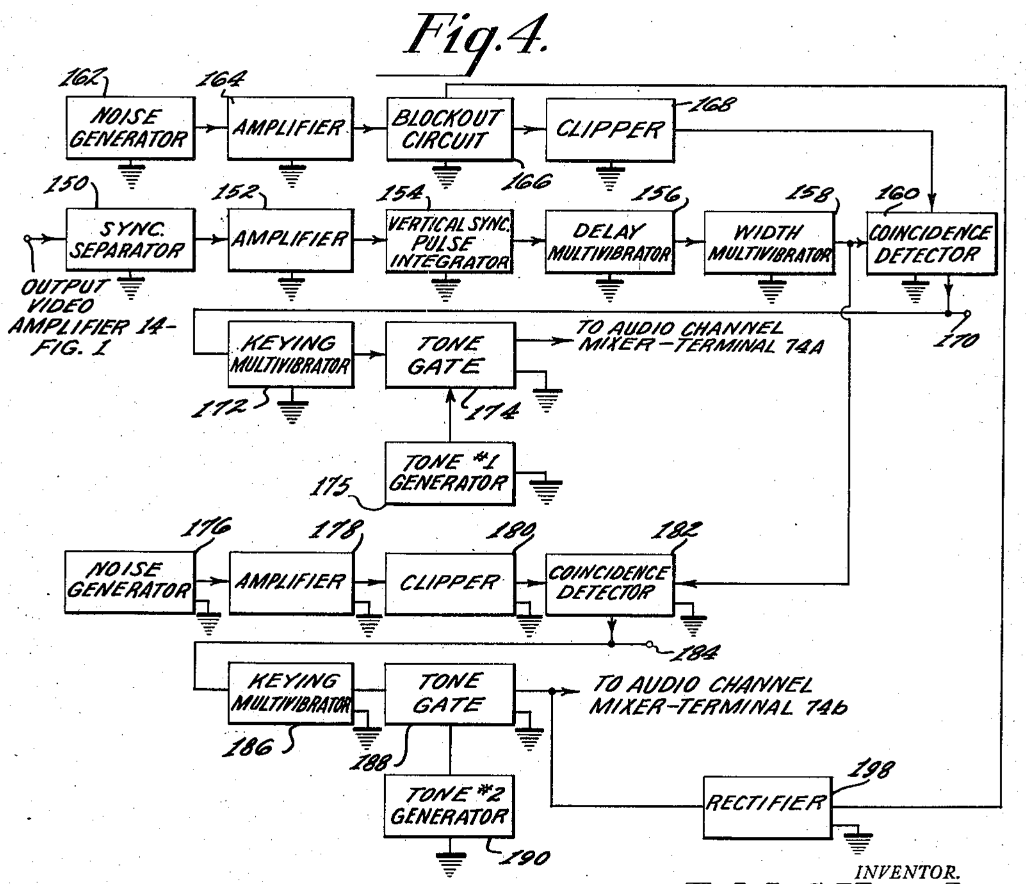
Figure 4 is a block diagram representation of one form of counter drive tone and counter reset tone generation circuit useful in the practice of the present invention.

As described in the above-identified United States patent application, by A. N. Goldsmith et al., Serial No. 308,642, "Television Systems," and as otherwise mentioned hereinabove, it is desirable that the television raster be stationary during the delineation of the lines comprising the raster. In other words, it is desirable that changes in horizontal and vertical shift signals be constrained to occur only during blanking intervals defined by the television signal. This is accomplished in connection with the random control action of the present invention, through the provision of the novel arrangement shown in Figure 4. The understanding of the operation of the arrangement of Figure 4 will be best obtained by additional reference to Figure 1. The arrangement of Figure 4 is adapted to supply the mixer terminals 74*a* and 74*b* of the mixer 74 in Figure 1 with bursts of tone No. 1 and tone No. 2 constrained to occur only during blanking intervals in the television signal. To accomplish this, output signal is taken from the video amplifier 14 of Figure 1 and applied to a conventional separator circuit 150 in Figure 4. The sync separator 150 is designed to supply the amplifier 152 with separated vertical sync pulses which in turn are applied to a vertical sync pulse integrator circuit 154. The output signal integrator circuit 154 is applied to control the delay multivibrator 156 which in turn actuates a width multivibrator 158. The width multivibrator 158 is designed to produce a pulse of very short duration recurring at the vertical synchronizing signal rate. The actual duration of this pulse is not critical and in most cases should have a duration at least one one-hundredth the duration of the television vertical sync pulse itself. The output signal from the width multivibrator 158 is then applied to one input terminal of a coincidence detector 160, at the other input terminal of the coincidence detector 160 is applied a signal derived from a noise generator circuit 162. The signal from the noise generator circuit is amplified by the amplifier 164 applied to a block out circuit 166 which is conditionally rendered open or closed to the conduction of the noise signal to the clipper circuit 168. Clipper circuit 168 is of the amplitude discriminatory type which permits only peaks of noise signal above a predetermined amplitude to pass to the coincidence detector 160. The coincidence detector 160 is so constructed according to well known practice, that it will produce an output signal at terminal 170 only when there happens to be a coincidence between the pulse derived from the width multivibrator 158 and a noise peak passed by the clipper 168. Upon such a coincidence the signal delivered by the coincidence detector 160 will trigger the keying multivibrator 172 which in turn will open the tone gate 174 to permit tone No. 1 to be applied to the mixer terminal 74*a* of Figure 1. The keying multivibrator 172 may be of the monostable variety so that the duration of the burst of tone will be governed by the recycling period of the multivibrator. Purely by way of example, tone No. 1 has been designated in Figure 1 as a counter drive tone. The counter reset tone designated as tone No. 2 is also, in accordance with the present invention, arranged to occur in a random manner but only during a blanking interval in the television signal. Thus, in Figure 4 a noise generator 176 feeds an amplifier 178 which in turn applies signal to a clipper circuit 180. The action of elements 176, 178 and 180 is identical to that described with that of 162, 164, 166 and 168, discussed above. Moreover, the coincidence detector 182 may be identical to the coincidence detector 160 discussed above. Since the coincidence detector 182 derives input signal from the width multivibrator 158 as the coincidence detector 160, the output signal 184 of detector 182 will also be random in nature but occurring only during a vertical blanking period. The keying multivibrator 186 is then provided which in turn operates the tone gate 188 which conditionally permits signal from tone generator No. 2 at 190 to be applied to the mixer terminal 74*b* of Figure 1.

In further accordance with the present invention, it has been found desirable in some instances to prevent a counter drive pulse from occurring during a counter reset pulse, since there would be a conflict in the action demanded by these pulses of the counter chain. Signal detecting means such as the rectifier 198 is, therefore, provided, in accordance with the present invention, for conditionally actuating the block out section 166 of Figure 4. By this means the occurrence of a counter reset pulse will block noise signal from reaching the clipper 168 and prevent the production of a counter drive pulse during a counter reset pulse.

One particular form of binary counter chain arrangement suitable for use with the present invention, as well as one possible mode of employing signals derived from such a counter chain for raster shifting purposes is shown in Figure 5. The arrangement in Figure 5 is also particularly convenient since it lends itself to easy control by a key card carrying printed circuits. Such a key card is shown at 198 in Figure 8 and will be later discussed in one of its many possible relations to the circuitry of Figure 5.

Before considering the general arrangement of the embodiment of the present invention shown in Figure 5, it is well to understand the type of raster shift motion that may be caused at the transmitter to produce the garbling effect in the transmitted television signal. As discussed in the above-identified application by A. N. Goldsmith et al., the most effective type of raster motion is of the Lissajous variety comprising horizontal and vertical shift components.

Figure 3:
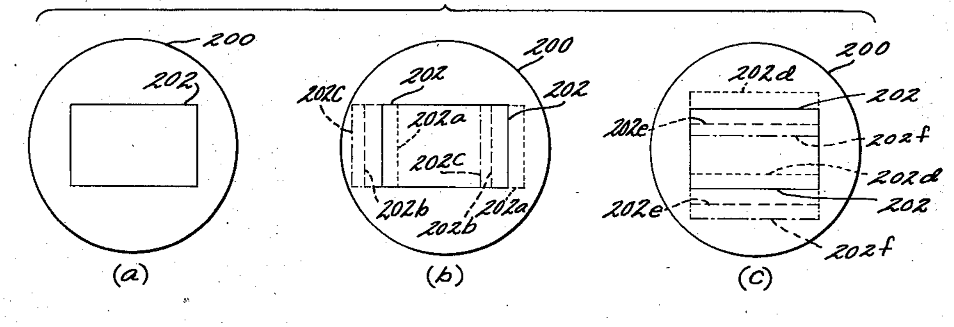
Figure 3 is an illustration of one form of television frame scrambling motion useful in the practice of the present invention.

One suitable form of Lissajous motion may be produced as illustrated in Figure 3. Here the outline 200 corresponds to the circular face of a kinescope or cathode ray beam picture reproducing tube. In Figures 3*a*, 3*b* and 3*c* solid line rectangle 202 corresponds to the television raster in an uncoded television system. In Figure 3*b* the raster position defined by the dotted lines 202*a* represents a raster shift to the right of the normal 202. Correspondingly, the raster positions indicated by the dashed lines 202*b* and 202*c* represent raster shifts to the left of the normal 202. In Figure 3*c* the raster position defined by the dotted lines 202*d* corresponds to an upward shift of the raster 202 with respect to its normal position, while the raster positions defined by the dashed lines 202*e* and 202*f* correspond to downward shifts in the vertical direction of the raster with respect to its normal position. It is thus seen that the raster may occupy four separate positions in the horizontal coordinate and four separate positions in the vertical coordinate. Random shifting of the raster between combinations of the horizontal and vertical positions will produce virtually complete disintegration of the television image when an attempt is made to receive such a television signal by standard television receiver circuits.

The arrangement of Figure 5 is arranged to produce the raster motion described in connection with Figure 3 at the transmitter as well as to produce a complementary raster shifting influence at a receiving location for reconstructing or degarbling the transmitted television signal. The circuitry of Figure 5 will be described in connection with a receiving circuit although it is evident that it is also applicable to a transmitting system of the type shown in Figure 1. It will be assumed that the reconstructed picture is to be made to appear on the screen of the kinescope 204. Kinescope 204 is shown as having standard horizontal and vertical deflection yoke windings 206 and 207. Horizontal and vertical deflection signal generators, which may be of any standard design, are indicated at 210 and 212, with the developed deflection wave forms being shown at 214 and 216. Horizontal deflection signal 214 is coupled to the input circuit of the horizontal driving tube 218. An autotransformer 220 and the primary winding 222 of a deflection coupling transformer 224 are connected in the anode circuit of the driver tube 218. A diode 226, linearity inductance 228 and storage capacitors 230 and 232 form a conventional power recovery B boost circuit for effectively increasing the anode potential applied to the tube 218 over that available at B power terminal 236. The operation of such a circuit is described in an article entitled "Characteristics of High Efficiency Deflection and High Voltage Supply Systems for Kinescopes" by Otto Schade, appearing in the December 1949 issue of the "RCA Review." The peaks of the high voltage signal excursions induced in the winding section 220' of the autotransformer 220 are rectified by the diode 236 to produce a beam accelerating potential of several thousand volts across a capacitor 238. Output terminal 240 is, therefore, designated for connection with the power anode beam accelerating electrode of the kinescope 204, having its terminal at 242.

In accordance with the present invention, a resistor 244 is connected as a load across the secondary 246 of the horizontal deflection output transformer 224. Sawtooth voltage will, therefore, appear across the resistor 244. The upper terminal of resistor 244 is coupled with the control electrode of cathode follower amplifier tube 250 so that current through the cathode follower will vary in a sawtooth fashion. The horizontal winding 206 of the deflection yoke is then connected between the cathode 252 of the cathode follower amplifier 250 and ground potential. "B" power for the cathode follower stage 250 is derived from the positive power supply terminal 254 referenced with respect to ground. The current through the deflection yoke 206 will, therefore, vary in a conventional sawtooth fashion.

Vertical deflection current for the vertical deflection winding 207 is provided in a similar fashion by the cathode follower stage 256, driven by a vertical deflection sawtooth developed across the load resistor 258. Vertical deflection transformer 260 provides the necessary coupling between the vertical deflection drive amplifier 262 and load resistor 258. The amplifier 262 is driven by the vertical deflection waveform described above.

The circuitry of Figure 5 thus far described will provide a standard beam deflection action in the kinescope 204. It will be assumed the magnetic polarity with which the deflection windings 206 and 207 are connected with the cathode circuits of amplifiers 250 and 256 is such that an increase in current through the deflection windings 206 and 207 will produce respective shifts to the left and up of the television raster. In order then to realize the deflection action shown in Figure 3 some form of centering control must be provided for each of the deflection windings, so that the rest position of the raster will correspond to positions 202*f* in Figure 3*b* and 202*c* in Figure 3*c*. This is accomplished through the action of the potentiometers 266 and 268 connected across negative voltage supply terminals 270 and 272. A balancing resistance 274 is then placed in shunt with the horizontal deflection windings. Another balancing resistance 276 is connected in shunt with the vertical deflection winding.

In accordance with the present invention, left hand shifting of the raster as well as upward shifting of the raster is produced by conditional increase in conduction of additional cathode follower stages 278, 280 and 282 in the horizontal deflection circuit and cathode follower amplifiers 284, 286 and 290 in the vertical deflection circuit. The static conduction current of these stages add to the nominal conduction through the horizontal and vertical deflection windings as previously described in connection with cathode follower amplifiers 250 and 256. In the horizontal deflection circuit increased conduction of any one of the amplifiers 278, 280 and 282 will act to shift the raster from its position 202*a* to the position 202 in Figure 3*b*. Conduction of any two of the amplifiers 278, 280 and 282 will act to shift the raster to its position 202*b* in Figure 3*b*, while increased conduction of all three amplifiers 278, 280 and 282 will act to shift the horizontal raster to its leftmost position 202*c* in Figure 3*b*. Corresponding action is provided in the vertical deflection circuit, where increased conduction through one of the amplifiers 284, 286 and 290 will shift the raster from its nominal position 202*f* to position 202*e*. Increased conduction in two of the cathode follower amplifiers, 284, 286 and 290 will produce the upward shift of the raster to 202, while increased conduction of the amplifiers 284, 286 and 290 will shift the raster to its uppermost position 202*d* in Figure 3*c*. In order, therefore, to control the position of the raster it is only necessary to control the conduction of the cathode follower amplifiers 278, 280 and 282 in the horizontal deflection circuit and cathode follower amplifiers 284, 286 and 290 in the vertical deflection circuit. Conduction control of these amplifiers is accomplished in accordance with the present invention by connecting the control electrodes of each cathode follower stage to predetermined points in a binary counter chain. As is well known to those skilled in the art, the voltage waveforms found in the stages of a binary counter chain are usually rectangular in shape, representing on or off conditions of conduction in the amplifying elements comprising the binary stages. The binary stages shown in Figure 5 each comprise two electron tube amplifiers. Binary counter stage 1 comprises tubes 292 and 294; binary stage 2 comprises tubes 296 and 298; binary stage 3 comprises tubes 300 and 302.

Each binary stage shown in Figure 5 is triggered, in accordance with well known practice, by means of signals passed by the triggering diodes 304, 306, 308, 310, 312 and 314 associated with each stage. The triggering diodes 304 and 306 receive signal drive from the tone detector 316 whose counterpart is found at 68 in Figure 1 and 144 in Figure 2. The binary stage No. 2 is triggered or driven by signals derived from binary stage No. 1 in a conventional manner. However, in accordance with the present invention, a coupling selector switching means 318 is provided so that the driving signal for binary stage No. 2 can be derived from either tube 292 or 294 of binary stage No. 1. In the position shown, switch 318 illustrates the driving of binary stage No. 2 from output signal derived from tube 294. A similar coupling selector switch 320 is provided between the output circuit of binary stage No. 2 and the drive circuit of binary stage No. 3. By altering the connections provided by the coupling selectors A and B at 318 and 320, the number of driving tone bursts provided by the tone detector 316 required to produce a given conduction phase in binary stage No. 2 or binary stage No. 3 can be changed.

As noted above, all binary stages may be reset by means of signal developed at the output circuit of tone No. 2 detector at 322. This is accomplished in a conventional manner through the agency of reset diodes 324, 326 and 328. The particular conduction phase in each binary stage produced by the effect of a reset signal will depend upon the position of reset selection switching means A, B and C at 330, 332 and 334. For example, if reset selector A at 330 is positioned as illustrated in Figure 5, the occurrence of a burst of tone No. 2 will cause binary stage No. 1 to reset with tube 292 in a conducting state. Similarly, reset selectors B and C in the position illustrated will produce reset of binary stages Nos. 2 and 3 with tubes 296 and 302 in a conducting state. Again, the particular set of connections provided by the reset selectors A, B and C will determine the number of bursts of tone No. 1 necessary to establish a given conduction state in each of the binary counter stages.

The raster shifting signals imposed upon the deflection currents passing through the deflection yoke windings 206 and 207 in Figure 5, are, in accordance with the particular embodiment of the present invention, shown in Figure 5, derived from the output circuits of each binary counter stage tube. Thus, cathode follower amplifier 278 in the horizontal raster shift circuit of the arrangement in Figure 5 derives its drive signal from the shift selector A switching means at 336. The lead 338 couples the terminal $HW_1$ (HW refers to horizontal wobble) which in turn is connected by the shift selector A to terminal P2 of the shift selector. Shift selector is provided with two terminals P2, each connected to the plate or anode of tube 294 of binary stage No. 1. The shift selector A is also provided with two terminals P1 connected to the plate or anode of tube 292 in binary stage No. 1. Similar connections are made between the other cathode follower stages 280 and 282 to shift selector B at 340 and shift selector C at 342, each corresponding respectively to binary stages No. 2 and No. 3. The vertical raster shift or wobble cathode follower amplifiers 284, 286 and 290 also receive driving signals from shift selectors A, B and C as indicated in the drawings by their connection to terminals $VW_1$ (VW referring to vertical wobble) $VW_2$ and $VW_3$ as indicated.

In the operation of the embodiment of the present invention shown in Figure 5, it will be seen that the raster shift signals imposed upon the deflection currents of the horizontal and vertical deflection windings 206 and 207 at any given instant will depend upon the connections provided by coupling selectors A and B, reset selectors A, B and C and shift selectors A, B and C. By altering the connections provided by these various switching elements, a large variety of randomly occurring raster shifting modes can easily be realized. Through the addition of additional binary counter stages an even greater variety of raster shift or wobble signal modes is made available.

The arrangement shown in Figure 5 is directed to the superimposition of raster shift of signals upon the deflection currents passing through a conventional beam deflection coil. As stated above, the arrangement of Figure 5 may be applied to either a transmitting or receiving system, in which case, in the case of a transmitting system, the kinescope 204 would be replaced by a suitable form of television camera tube. The use of a special deflection coil exclusively for raster shifting purposes to supplement a standard deflection coil has been discussed and illustrated in Figure 2. Such a coil is shown embracing the electron ray tube 102 and having windings 122 and 124. Excitation of such a coil from the binary counter system shown in Figure 5 may be accomplished in accordance with the present invention as shown in Figure 6. Here cathode follower amplifier stages 344, 346 and 348 are indicated for driving either the horizontal or vertical deflection windings such as 122 and 124 in Figure 2. In the case of a receiver system, such as shown in Figure 2, the windings 122 and 124 would form what may be termed an image reconstruction yoke.

One convenient means for providing rapid changing of the connections provided by coupling selectors A and B, reset selectors A, B and C, and shift selectors A, B and C in the binary counter chain is shown in Figures 7 and 8. A key card holder 350 is provided which will accept a key card 198. Contactors such as 354, 356, 358 and 360 make connection with printed circuit paths carried by the card 198. One useful form of key control card carrying suitable printed circuit paths in accordance with the present invention is shown in Figure 8. Reference to the binary counter chain coupling selector, reset selector and shifting set arrangements shown in Figure 5 will make clear the significance of the printed circuit paths illustrated in the card 198. For convenience, the circuit paths of card 198 have been labelled to make reference to the corresponding function assigned to them in connection with the binary counter chain of Figure 5. By providing a series of key control cards such as 198 each containing a different circuit path arrangement, a high degree of security can be realized in the operation of a television system of the type described. All that will be necessary is that each authorized subscriber to the paid television system employing the present invention be provided with a card accomplishing the same connections as the control card employed at the transmitter.

It will be clear from the foregoing description of the present invention that more simple modes of raster shift signals may be employed with a corresponding reduction in equipment cost. One form of such simplification can be realized in the above-described embodiments by removing one or more of the binary counter stages or the cathode follower stages employed to impose raster shift signals upon normal raster deflection action at either transmitter or receiver.

What is claimed is:

1. In a television receiving system, the combination of: a sound receiving channel adapted to demodulate and deliver at respective output terminals a sound signal, a first control tone and a second control tone, said control tones falling outside the range of said sound signal; an electrical counting circuit having a plurality of count indicating output terminals which conditionally deliver electrical signals upon the attaining of predetermined counts in said counting circuit, said counting circuit also having a driving signal input terminal and a reset signal input terminal; signal coupling means connected from said first and said second control tone output terminals to said driving signal input terminal and reset signal input terminals respectively; a television video signal visual reproducing means; a picture garbling circuit connected with said last named means and having an input terminal, to which signals may be applied to control said garbling circuit; and signal coupling means connected from at least one of said indicating output terminals to said garbling circuit input terminal.

2. An electrical control system comprising in combination: an electrical counting chain including a plurality of binary counter stages each stage having two count indicating output terminals at which alternately appears electrical signals representing the counting state of that stage, each binary counter stage additionally having a counting signal driving terminal and two count reset terminals the application of reset signal to each reset terminal causing said stage to reset to a predetermined and respective counting condition; a source of count driving signal; a source of counter reset signal; selective switching means connected from a binary stage driving terminal to the count indicating terminals of the immediately preceding binary stage; selective switching means connected from said counter reset signal source to a plurality of said count reset terminals at least two of which are associated with the same binary stage; signal coupling means connected between said source of driving signal and the driving terminal of at least one of said binary counter stages; an electrical signal responsive instrumentality having a signal input terminal and selective switching means connected between said instrumentality signal input terminal and a plurality of said binary counter stage count indicating output terminals.

3. A television control signal generating system, comprising in combination: a source of vertical synchronizing signals; multivibrator means connected with said vertical synchronizing signal source for producing pulses of shorter duration than said vertical synchronizing pulses but of the same recurrence frequency; a random noise generator; a signal coincidence circuit connected with said multivibrator means and said noise generator for producing a coincidence pulse upon coincidence of a random noise excursion and one of said shorter duration pulses; a control signal generator; a control signal delivering terminal and switching means coupled with said coincidence circuit, said signal generator and said delivery terminal for applying control signal to said delivering terminal under the control of said coincidence pulse.

4. A television control signal generating system, the combination of: a source of vertical synchronizing signals; a multivibrator means connected with said vertical synchronizing signal source for producing pulses of shorter duration than said vertical synchronizing pulses but of the same recurrence frequency; a first and a second random noise generator; a first and a second signal coincidence circuit respectively connected with said first and second random noise generators and said multivibrator means for producing respective coincidence pulses upon the coincidence of random noise excursions and said shorter duration pulses; a first and second control signal generator; a first and second control signal delivering terminal switching means coupled with said first coincidence circuit, said first signal generator and said first control signal delivering terminal for applying control signal to said first signal delivering terminal under the control of coincidence pulses developed by said first coincidence circuit, switching means coupled with said second coincidence circuit, said second signal generator and said second control signal delivering terminal for applying control signal to said second signal delivering terminal under the control of coincidence pulses developed by said second coincidence circuit; circuit disabling means coupled with said first coincidence circuit for conditionally preventing the appearing of first control signal at said first control signal delivering terminal; and connections from said circuit disabling means to said second control signal delivering terminal for controlling said disabling means with signals appearing at said second control signal delivering terminal.

5. In a television receiving system the combination of: a video signal receiving and demodulating channel for producing a video signal; a television sound channel receiving and demodulating circuit for producing a television sound signal, said sound channel being adapted to also demodulate control signals of a frequency higher than television picture accompaniment sound channel components; means coupled with said video signal demodulating circuit for producing a visual television image in accordance with said video signal; cathode ray beam deflection means included in said last named means for defining a picture raster; an electrical counting circuit having a plurality of count indicating output circuits at which signals appear upon the reaching of predetermined counts in said counting circuit; said counting circuit also having a driving input circuit; signal coupling means coupled between said sound signal demodulating circuit and said counting circuit driving input circuit, said signal coupling means operatively including switching means permitting selective connection of said cathode ray beam deflection means to predetermined count indicating output circuits, said switching means including a card member bearing predetermined conductive paths and additional means for conditionally receiving and holding said card member while electrically sensing different conductive path configurations borne by a plurality of different card members which may be placed in said receiving and holding means; and signal coupling means connected from at least one of said counting circuits to said cathode ray beam deflection means for control thereof.

6. A cathode ray beam deflection system comprising in combination: a binary counter chain comprising a plurality of binary counter stages, each stage having two output terminals, the conditional and alternate appearance of signals at which represent the counting condition of the respective stages, the stages of said binary counter circuit being coupled to one another by coupling selector switching means so connected as to permit drive of one binary stage by count representing signals appearing at a selected one of the two output terminals of the preceding binary counting stage, each binary counter stage operatively including two reset signal terminal means each for resetting the stage for respective one of said two counting conditions; means connected with said count chain for conditionally driving said chain to predetermined counts; a vertical and horizontal cathode ray beam deflection circuit so related as to produce a raster determining deflection influence; a vertical and a horizontal raster shifting means coupled with said deflection circuits each shifting means having an activating terminal; switching means coupled with said binary stage output terminals and said vertical and horizontal raster shifting terminals for conditionally activating said shifting means by count representing signals delivered by predetermined groups of binary counter stages; a source of reset signals; and selective switching means coupled with said reset signal source and said counter chain reset signal terminals for selectively applying reset signals to predetermined reset signal terminals so as to reset said counter stages each in a predetermined counting condition.

References Cited in the file of this patent

UNITED STATES PATENTS 2,501,274 Hamilton ............... Mar. 21, 1950
2,656,406 Gray et al. ............... Oct. 20, 1953
2,656,410 Herrick et al. ............... Oct. 20, 1953
2,664,460 Roschke ............... Dec. 29, 1953
2,678,347 Clothier ............... May 11, 1954
2,731,620 Gottfried ............... Jan. 17, 1956

Disclaimer 2,846,497.—*Ralph C. Kennedy*, Queens Village, N.Y. TELEVISION SYSTEMS. Patent dated Aug. 5, 1958. Disclaimer filed Oct. 3, 1962, by the assignee, *Radio Corporation of America.*

Hereby enters this disclaimer to claim 1 of said patent.

[*Official Gazette November 20, 1962.*]